United States Patent
Ueda et al.

(10) Patent No.: US 9,928,053 B2
(45) Date of Patent: Mar. 27, 2018

(54) JOINT ACQUISITION OF UPDATE SOFTWARE FOR MULTIPLE DEVICES

(71) Applicant: NINTENDO CO., LTD., Kyoto (JP)

(72) Inventors: Masani Ueda, Kyoto (JP); Shinobu Suzuki, Kyoto (JP); Toru Yamashita, Kyoto (JP); Yoichi Ooshima, Kyoto (JP); Yohei Tsukada, Kyoto (JP); Yosuke Fujino, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 141 days.

(21) Appl. No.: 14/036,695

(22) Filed: Sep. 25, 2013

(65) Prior Publication Data

US 2014/0137096 A1    May 15, 2014

(30) Foreign Application Priority Data

Nov. 15, 2012 (JP) ................................. 2012-251045

(51) Int. Cl.
   *G06F 9/44* (2006.01)
   *G06F 9/445* (2018.01)

(52) U.S. Cl.
   CPC ..................... *G06F 8/65* (2013.01)

(58) Field of Classification Search
   CPC ....................................................... G06F 8/65
   USPC ....................................................... 717/171
   See application file for complete search history.

(56) References Cited

U.S. PATENT DOCUMENTS

| 7,523,052 B2 * | 4/2009 | Yodo ............................. 705/30 |
| 8,078,635 B2 * | 12/2011 | Higuchi et al. ............... 707/783 |
| 2004/0237079 A1 * | 11/2004 | Cox .......................... G06F 8/65 717/168 |

(Continued)

FOREIGN PATENT DOCUMENTS

| JP | 2003-167742 | 6/2003 |
| JP | 2003167742 A * | 6/2003 ............. G06F 9/445 |

(Continued)

OTHER PUBLICATIONS

Whitwam, Microsoft Tweaks Kinect Firmware, Windows Hardware Coming (Published Nov. 21, 2011) retrieved from http://www.maximumpc.com/microsoft-tweaks-kinect-firmware-windows-hardware-coming/ on May 31, 2015.*

*Primary Examiner* — Lewis A Bullock, Jr.
*Assistant Examiner* — Theodore Hebert
(74) *Attorney, Agent, or Firm* — Nixon & Vanderhye P.C.

(57) ABSTRACT

An example of a game apparatus, regardless of whether or not a peripheral device is connected to the game apparatus, acquires, from a server, update data for main body system software for controlling the game apparatus, together with update data for peripheral device system software, and saves the pieces of update data in a data storage unit. If the peripheral device is connected to the game apparatus, the game apparatus updates the main body system software and the peripheral device system software using the pieces of update data stored in the data storage unit. If the peripheral device is not connected to the game apparatus, the game apparatus updates only the main body system software. If the peripheral device has been connected to the game apparatus after that, the game apparatus updates the peripheral device system software using the update data stored in the data storage unit.

15 Claims, 10 Drawing Sheets

(56) References Cited

U.S. PATENT DOCUMENTS

| | | | |
|---|---|---|---|
| 2006/0015905 A1* | 1/2006 | Lee | G06F 8/65 725/50 |
| 2011/0105029 A1 | 5/2011 | Takayashiki et al. | |
| 2011/0107322 A1* | 5/2011 | Hashiguchi | 717/170 |
| 2012/0131324 A1* | 5/2012 | Ansari et al. | 713/100 |
| 2013/0003660 A1* | 1/2013 | Zhong et al. | 370/328 |
| 2014/0137096 A1* | 5/2014 | Ueda et al. | 717/171 |
| 2014/0298314 A1* | 10/2014 | Manion et al. | 717/172 |

FOREIGN PATENT DOCUMENTS

| | | |
|---|---|---|
| JP | 2005-32184 | 2/2005 |
| JP | 2010-49464 | 3/2010 |
| JP | 2011-118884 | 6/2011 |

\* cited by examiner

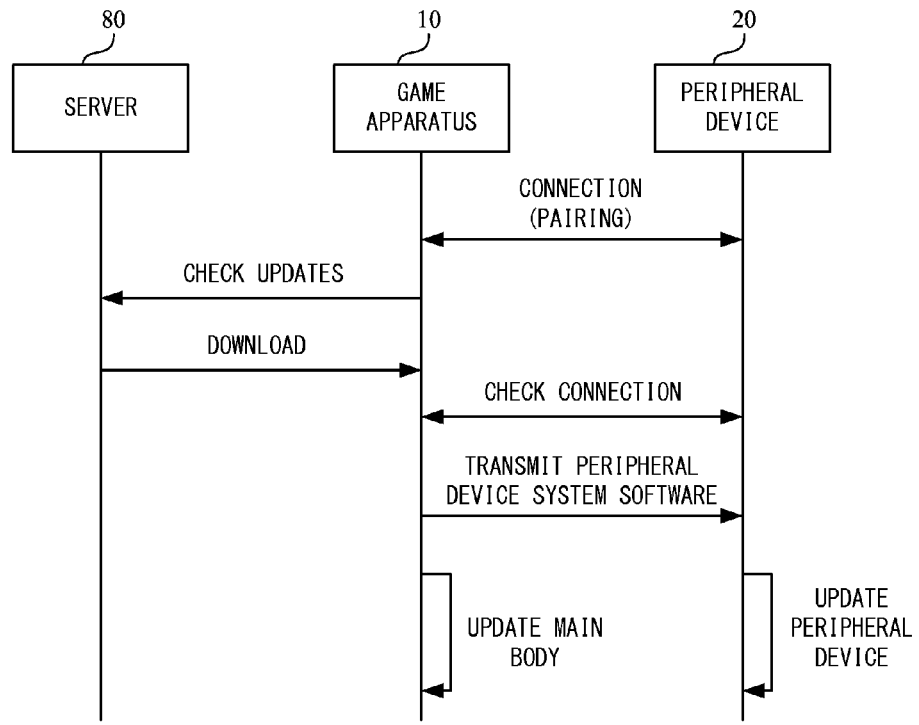

F I G. 7
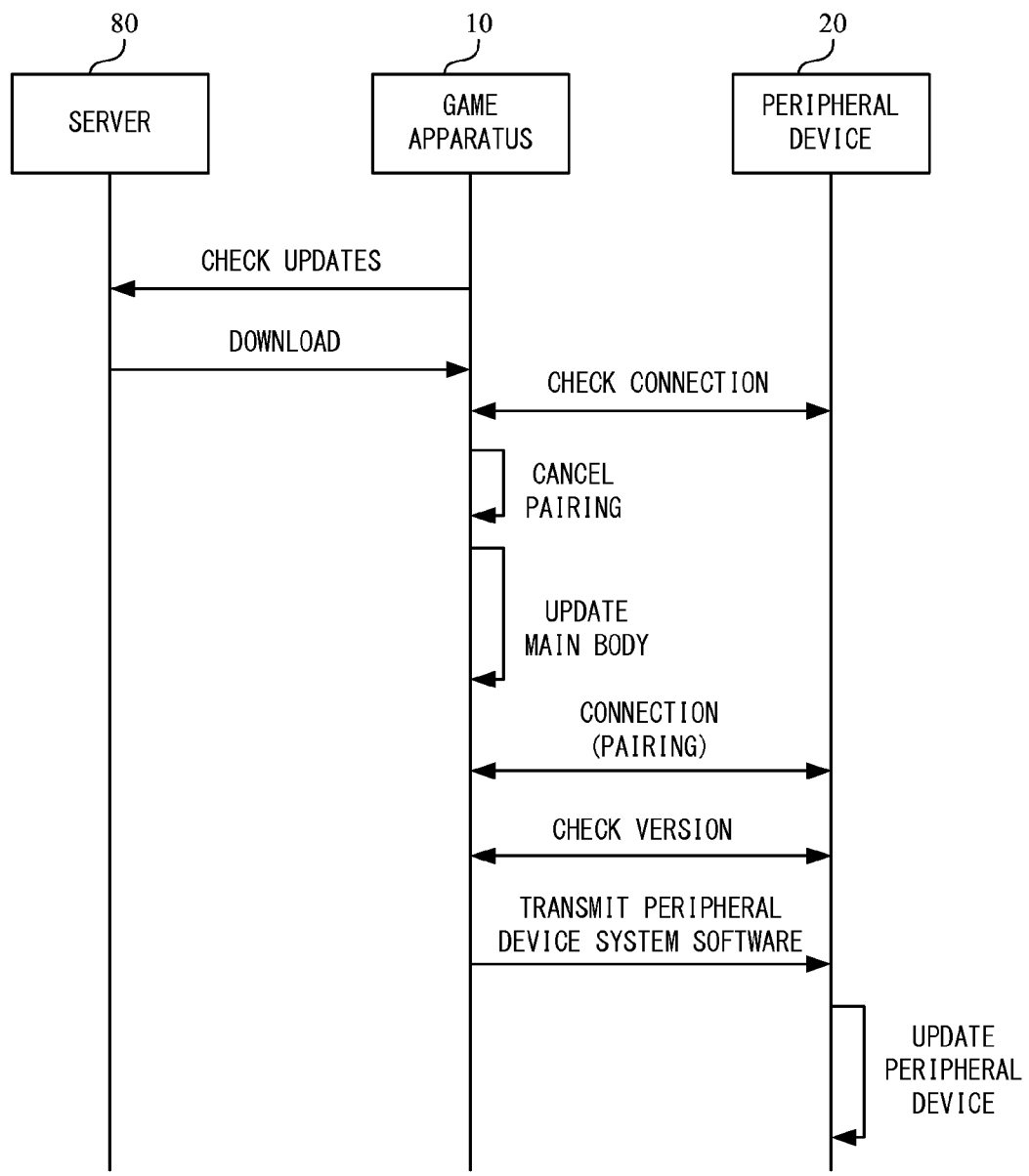

F I G. 1 0
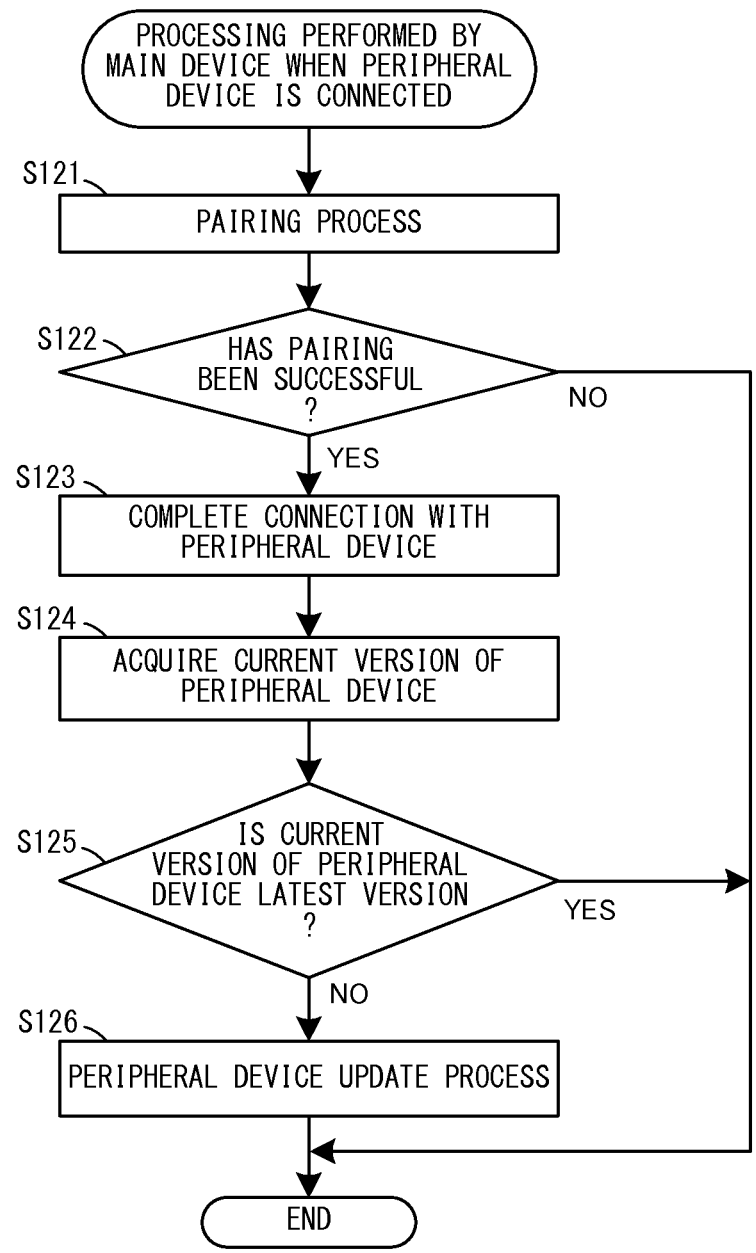

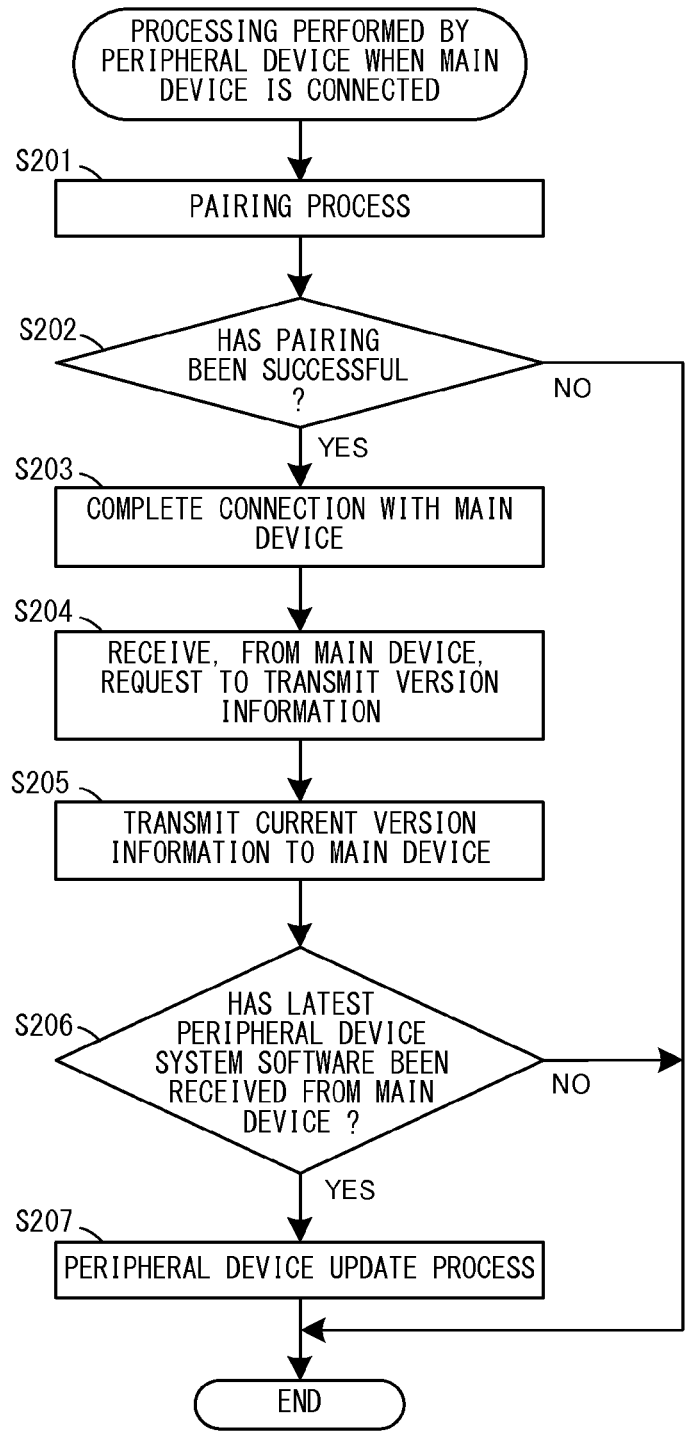

JOINT ACQUISITION OF UPDATE SOFTWARE FOR MULTIPLE DEVICES

CROSS REFERENCE TO RELATED APPLICATION

The disclosure of Japanese Patent Application No. 2012-251045, filed on Nov. 15, 2012, is incorporated herein by reference.

FIELD

The technology disclosed herein relates to an information processing system, an information processing apparatus, and an information processing method that are capable of updating system software, and a non-transitory computer-readable storage medium having stored therein an information processing program capable of updating system software.

BACKGROUND AND SUMMARY

Conventionally, there is a main device that, if an accessory device has been newly added to the main device, automatically downloads the firmware of the accessory device from a service site to the main device and updates the firmware of the accessory device. Further, in such a conventional technique, also the firmware of the main device is individually downloaded and updated.

In the conventional technique, however, only either one of the main device and the accessory device may be able to be updated depending on the state of connection between the main device and the service site or the state of connection between the main device and the accessory device.

Therefore, it is an object of an exemplary embodiment to provide a technique capable of updating each of the pieces of system software of devices capable of being connected to each other.

To achieve the above object, the exemplary embodiment employs the following configurations.

An exemplary embodiment is an information processing system capable of being connected to a second device having second system software. The information processing system includes a storage unit, an update data acquisition unit, and an update unit. The storage unit stores first system software for controlling the information processing system. The update data acquisition unit, regardless of whether or not the second device is connected to the information processing system, externally acquires first update data for updating the first system software, together with second update data for updating the second system software, and saves the first update data and the second update data. The update unit updates the first system software stored in the storage unit and the second system software, using the first update data and the second update data.

It should be noted that the update unit may update the second system software, or the update unit may transmit the second update data to the second device, thereby updating the second system software. That is, the update unit may directly or indirectly update the first system software and the second system software.

Based on the above, even if the second device is not connected to the information processing system, it is possible to acquire and save both the first update data and the second update data. This makes it possible to update the two pieces of system software.

In addition, in another configuration, the information processing system may further include a connection determination unit configured to determine whether or not the second device is connected to the information processing system. If the second device is not connected to the information processing system, the update unit may update the first system software using the first update data without updating the second system software.

Based on the above, even if the second device is not connected to the information processing system, it is possible to update the first system software of the information processing system. For example, it is possible to bring the information processing system into the latest state.

In addition, in another configuration, if, after the update unit has updated the first system software using the first update data when the second device had not been connected to the information processing system, the second device has been connected to the information processing system, the update unit may update the second system software using the second update data acquired together with the first update data by the update data acquisition unit.

Based on the above, even if the information processing system cannot externally acquire the second update data when the second device has been connected to the information processing system, it is possible to update the system software of the second device using the saved second update data.

In addition, in another configuration, if the second device has been connected to the information processing system, the update unit may automatically update the second system software, not on the basis of an operation of a user.

Based on the above, if the second device has been connected to the information processing system, it is possible to automatically update the second device. Thus, when the information processing system has been updated, it is possible to certainly update also the second device. This makes it possible to, for example, make small the difference in the version of the system software between the information processing system and the second device.

In addition, in another configuration, the information processing system may further include a second device determination unit configured to, if the second device has been connected to the information processing system, determine, on the basis of the second update data and the second system software stored in the second device, whether or not the second system software is to be updated. If the second device determination unit has determined that the second system software is to be updated, the update unit updates the second system software using the second update data.

Based on the above, if the second device has been connected to the information processing system, it is possible to determine, on the basis of the current second system software and the acquired second update data, whether or not the second system software is to be updated. For example, it is determined whether or not the version of the current second system software is older. If the version of the current second system software is older, it is possible to update the second system software.

In addition, in another configuration, the update data acquisition unit may hold the second update data even after the update unit updates the second system software.

Based on the above, even after the second device has been updated, the information processing system can hold the second update data. For example, it is possible to update a plurality of second devices.

In addition, in another configuration, if the second device is connected to the information processing system, the update unit may update the first system software using the first update data, and also update the second system software using the second update data.

Based on the above, if the second device is connected to the information processing system, it is possible to update the two devices.

In addition, in another configuration, the update data acquisition unit may acquire the first update data and the second update data corresponding to the first update data.

Based on the above, it is possible to acquire the second update data corresponding to the first update data. Thus, it is possible to cause the pieces of system software of the updated two devices to correspond to each other.

In addition, in another configuration, the update data acquisition unit may acquire the first update data and the second update data as a set.

Based on the above, it is possible to acquire the first update data and the second update data as a set. Thus, it is possible to update the first system software and the second system software using the two pieces of update data as a set.

In addition, in another configuration, the information processing system may further include a network connection unit capable of being connected to a network, or a medium data reading unit capable of reading external data from a portable storage medium. The update data acquisition unit acquires the first update data and the second update data via the network or the storage medium.

Based on the above, it is possible to acquire update data via a network or a storage medium.

In addition, in another configuration, the information processing system may further include a connection information storage unit, a communication unit, and a connection cancellation unit. The connection information storage unit stores connection information required for communication with the second device. The communication unit, if the connection information is stored in the connection information storage unit, communicates with the second device. The connection cancellation unit, if the second device is not connected to the information processing system when the update unit updates the first system software and the second system software, deletes the connection information stored in the connection information storage unit.

Based on the above, if the connection information is stored in the information processing system, the information processing system communicates with the second device. If the second device is not connected to the information processing system when the first system software and the second system software are updated, the information processing system deletes the connection information and cancels the connection with the second device.

In addition, another exemplary embodiment is an information processing apparatus for being connected to a first device having a first system software and cooperating with the first device. The first device externally acquires first update data for updating the first system software, together with second update data for updating second system software for controlling the information processing apparatus, and saves the first update data and the second update data. The information processing apparatus includes a storage unit, a connection establishment unit, a notification unit, and an update unit. The storage unit stores the second system software. The connection establishment unit transmits or receives information to or from the first device, and establishes a connection between the information processing apparatus and the first device. The notification unit, after the connection establishment unit has established the connection between the information processing apparatus and the first device, notifies, in accordance with a request from the first device, the first device of version information of the second system software stored in the storage unit. The update unit receives the second update data transmitted from the first device in accordance with the notification made by the notification unit, and updates the second system software stored in the storage unit, using the received second update data.

Based on the above, the first device can acquire the second update data, and it is possible to receive the second update data from the first device and update the information processing apparatus.

It should be noted that the information processing system may include a plurality of apparatuses, or may include a single apparatus. Further, another exemplary embodiment may be an information processing apparatus, an information processing program, or an information processing method.

Based on the exemplary embodiment, it is possible to update the pieces of system software of two devices capable of being connected to each other.

These and other objects, features, aspects and advantages of the exemplary embodiment will become more apparent from the following detailed description of the exemplary embodiments when taken in conjunction with the accompanying drawings.

BRIEF DESCRIPTION OF THE DRAWINGS

FIG. 4 is a diagram showing a non-limiting example of an overview of the flow of an update process shown in FIG. 3;

FIG. 5 is a diagram showing non-limiting examples of the contents of a package that can be acquired by the game apparatus 10;

FIG. 7 is a diagram showing a non-limiting example of an overview of the flow of an update process shown in FIG. 6;

FIG. 10 is a flow chart showing non-limiting examples of the details of the processing performed by the game apparatus 10 when the peripheral device 20 is connected to the game apparatus 10 later; and FIG. 11 is a flow chart showing non-limiting examples of the details of the processing performed by the peripheral device 20 when the peripheral device 20 is connected to the game apparatus 10 later.

DETAILED DESCRIPTION OF NON-LIMITING EXAMPLE EMBODIMENTS

[1. Overall Configuration of Game System]

Figure 1:
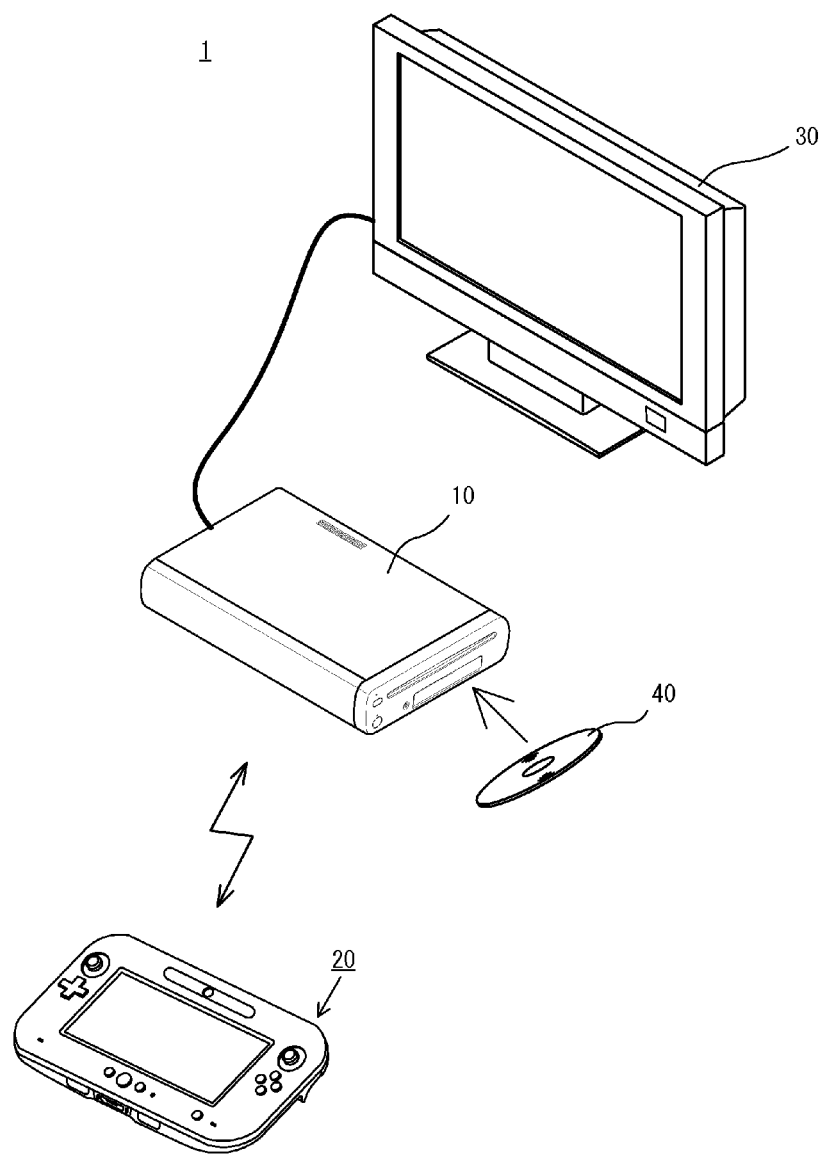
FIG. 1 is an external view of a non-limiting example of a game system 1.

With reference to the drawings, a game system 1 according to an exemplary embodiment is described below. FIG. 1 is an external view of the game system 1. In FIG. 1, the game system 1 includes a stationary game apparatus 10 (a first device), a portable peripheral device 20 (a second device), a display apparatus (for example, a television receiver; hereinafter referred to as a "television") 30, and an optical disk 40.

The game apparatus 10 is connected to the television 30, and an image generated by the game apparatus 10 is displayed on the television 30. Further, the optical disk 40, which is an example of an information storage medium, is detachably inserted into the game apparatus 10. The game apparatus 10 loads an application program (for example, a game program) stored in the optical disk 40 and executes the application program.

The peripheral device 20 is, for example, a device capable of being connected wirelessly to the game apparatus 10, and can be connected to and disconnected from the game apparatus 10. Further, the peripheral device 20 can be turned on and off independently of the game apparatus 10. The peripheral device 20 is of such a size that a user can hold it. The peripheral device 20 can function as an input apparatus that receives an operation of the user, and can transmit input information to the game apparatus 10. The peripheral device 20 can function also as a portable display apparatus and output output information (an image or the like) from the game apparatus 10.

It should be noted that a controller different from the peripheral device 20 may be connected to the game apparatus 10, and the user may perform an operation on the controller, thereby performing an operation (the start of an application, a game operation, or the like) on the game apparatus 10.

Figure 2:
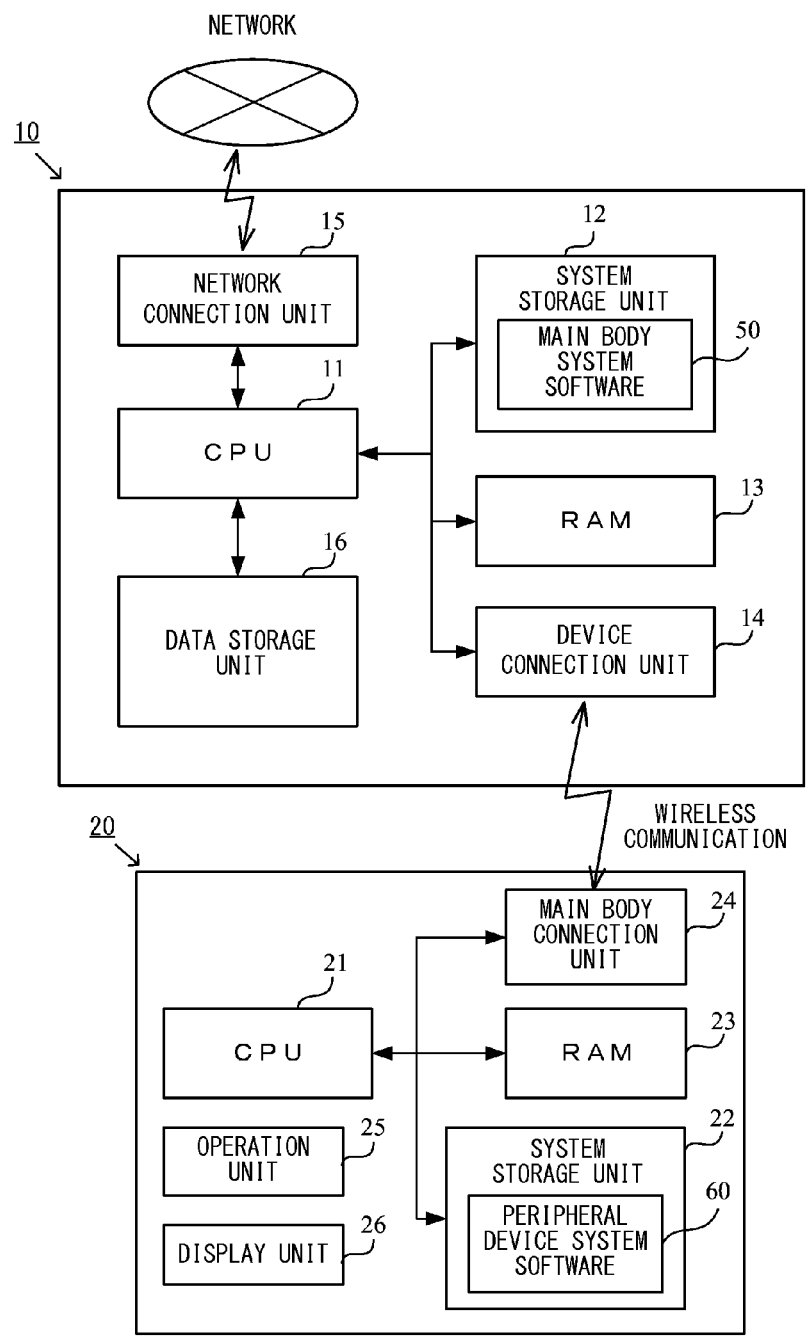
FIG. 2 is a block diagram showing non-limiting examples of the internal configurations of a game apparatus 10 and a peripheral device 20.

FIG. 2 is a block diagram showing the internal configurations of the game apparatus 10 and the peripheral device 20. As shown in FIG. 2, the game apparatus 10 includes a CPU 11, which makes various calculations in accordance with a program, a system storage unit 12, a RAM 13, a device connection unit 14, a network connection unit 15, and a data storage unit 16.

The system storage unit 12 is a non-volatile storage device and may be composed of, for example, a flash memory or a hard disk device. The system storage unit 12 stores main body system software 50.

The device connection unit 14 is a wireless module for communicating wirelessly with the peripheral device 20. The game apparatus 10 can receive and transmit data from and to the peripheral device 20 via the device connection unit 14. The network connection unit 15 is a communication module for connecting to a network such as the Internet. For example, the game apparatus 10 can acquire data from a server on the Internet via the network connection unit 15.

The data storage unit 16 is a non-volatile storage device and may be composed of, for example, a flash memory or a hard disk device. The data storage unit 16 can store data acquired from a server on the Internet by the game apparatus 10. It should be noted that the system storage unit 12 and the data storage unit 16 may be achieved by physically the same hardware, or may be achieved by pieces of hardware different from each other.

The main body system software 50 stored in the system storage unit 12 is software stored in advance for managing and controlling the hardware in the game apparatus 10, and is basic software for performing input/output management, resource management, and the like. The CPU 11 loads the main body system software stored in the system storage unit 12 into the RAM 13 when the game apparatus 10 has been turned on, and the CPU 11 executes the main body system software.

It should be noted that in the exemplary embodiment, "system software" is software for controlling the device, and is a broad concept including an OS (operating system), firmware, and the like.

The peripheral device 20 includes a CPU 21, which makes various calculations in accordance with a program, a system storage unit 22, a RAM 23, a main body connection unit 24, an operation unit 25, and a display unit 26.

The system storage unit 22 is a non-volatile storage device and may be composed of, for example, a flash memory or a hard disk device. The system storage unit 22 stores peripheral device system software 60.

The main body connection unit 24 is a wireless module for communicating wirelessly with the game apparatus 10. The peripheral device 20 can transmit and receive data to and from the game apparatus 10 via the main body connection unit 24. The operation unit 25 includes, for example, an operation button, which is pressed by the user, a sensor for detecting the orientation of the peripheral device 20 itself, a touch panel, and the like. The display unit 26 is a display apparatus for displaying a character and an image based on the processing performed by the game apparatus 10 or the peripheral device 20. For example, operation data based on an operation on the operation unit 25 is transmitted from the peripheral device 20 to the game apparatus 10, and processing based on the operation data is performed by the game apparatus 10. Then, the resulting image data is transmitted from the game apparatus 10 to the peripheral device 20 and is displayed on the display unit 26.

The peripheral device system software 60 stored in the system storage unit 22 is software stored in advance for managing and controlling the hardware in the peripheral device 20, and is basic software for performing input/output management, resource management, and the like. The CPU 21 loads the peripheral device system software stored in the system storage unit 22 into the RAM 23 when the peripheral device 20 has been turned on, and the CPU 21 executes the peripheral device system software.

(Overview of Update)

Next, the update of the game apparatus 10 and the peripheral device 20 according to the exemplary embodiment is described. It should be noted that in the exemplary embodiment, any change made in software, including a major improvement and a minor modification of system software, the addition, the change, and the deletion of functions, and the like, is referred to as an "update". Further, the "update" means both the making of any change in a part of existing system software to obtain new system software, and the replacement of the entirety of existing system software with the entirety of new system software.

As described above, a piece of system software is installed on each of the game apparatus 10 and the peripheral device 20 so that the pieces of system software are executed on the respective devices, whereby the two devices cooperate with each other to execute one application (for example, a game program). Thus, the pieces of system software installed on the two devices need to be updated so as not to hinder the cooperation of the two devices.

Figure 3:
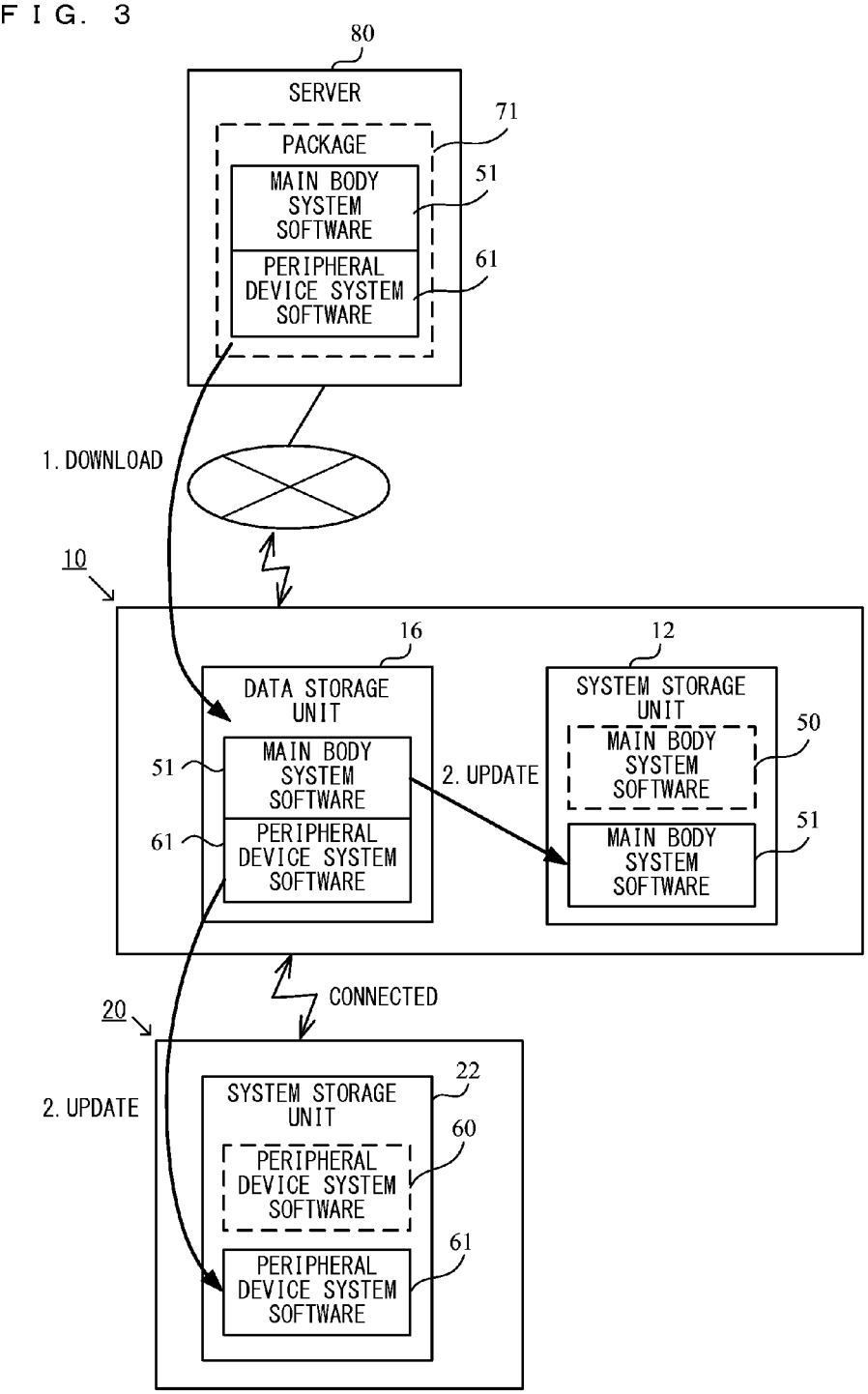
FIG. 3 is a diagram showing a non-limiting example of the state where, when the game apparatus 10 and the peripheral device 20 are connected to each other, the game apparatus 10 downloads pieces of system software from a server on the Internet, thereby updating the pieces of system software of the game apparatus 10 and the peripheral device 20.

FIG. 3 is a diagram showing the state where, when the game apparatus 10 and the peripheral device 20 are connected to each other, the game apparatus 10 downloads the latest versions of the pieces of system software from a server on the Internet, thereby updating the pieces of system software of the game apparatus 10 and the peripheral device 20. It should be noted that FIG. 3 shows only the parts of FIG. 2 that are necessary for description.

As shown in FIG. 3, a server 80 on the Internet stores package data 71 in which main body system software 51 and peripheral device system software 61 are packaged. The main body system software 51 is the latest system software that operates on the game apparatus 10. The peripheral device system software 61 is the latest system software that operates on the peripheral device 20.

First, the game apparatus 10 accesses the server 80 on the Internet via the network connection unit 15 and downloads the package 71 including the main body system software 51 and the peripheral device system software 61. The main body system software 51 and the peripheral device system software 61 that have been downloaded are stored in the data storage unit 16. Next, the game apparatus 10 updates the main body system software 50 stored in the system storage unit 12, using the downloaded main body system software 51, and transmits the downloaded peripheral device system software 61 to the peripheral device 20. The peripheral device 20 updates the peripheral device system software 60 stored in the system storage unit 22, using the received peripheral device system software 61.

FIG. 4 is a diagram showing an overview of the flow of an update process shown in FIG. 3. As shown in FIG. 4, first, the connection (pairing) between the game apparatus 10 and the peripheral device 20 is established. The pairing between the game apparatus 10 and the peripheral device 20 enables the game apparatus 10 and the peripheral device 20 to communicate with each other. Once the pairing has been established, the same identification information is stored in each of the game apparatus 10 and the peripheral device 20. Thus, for example, even if the game apparatus 10 and/or the peripheral device 20 have been turned off, the game apparatus 10 and/or the peripheral device 20 may be turned on again, thereby enabling the two devices to communicate with each other.

After the connection between the game apparatus 10 and the peripheral device 20 has been established, the game apparatus 10 accesses the server 80 at predetermined timing and checks whether or not the latest package data is present. If the latest package data is present, the game apparatus 10 downloads update data of the package (the package including the main body system software 51 and the peripheral device system software 61) from the server 80. Next, the game apparatus 10 checks whether or not the peripheral device 20 is connected to the game apparatus 10. If the peripheral device 20 is connected to the game apparatus 10, the game apparatus 10 transmits the downloaded peripheral device system software 61 to the peripheral device 20. Then, the game apparatus 10 updates the main body system software, and the peripheral device 20 updates the peripheral device system software. As described above, if the game apparatus 10 and the peripheral device 20 are connected to each other, the pieces of system software are updated in the two devices almost simultaneously in a parallel manner. It should be noted that after the main body system software 50 of the game apparatus 10 has been updated, the peripheral device system software 61 may be transmitted to the peripheral device 20, and the peripheral device 20 may be updated.

It should be noted that the package saved in the server 80 includes the main body system software and the peripheral device system software, but both the main body system software and the peripheral device system software are not necessarily in the latest versions. FIG. 5 is a diagram showing the contents of the package that can be acquired by the game apparatus 10. As shown in FIG. 5, the game apparatus 10 may acquire as the latest package the package in which only the main body system software has been updated, the package in which only the peripheral device system software has been updated, or the package in which both the main body system software and the peripheral device system software have been updated.

For example, the package stored in the server 80 is provided with version information. The game apparatus 10 acquires the version information of the package, and thereby can determine whether or not at least one of the main body system software and the peripheral device system software has been updated.

Figure 6:
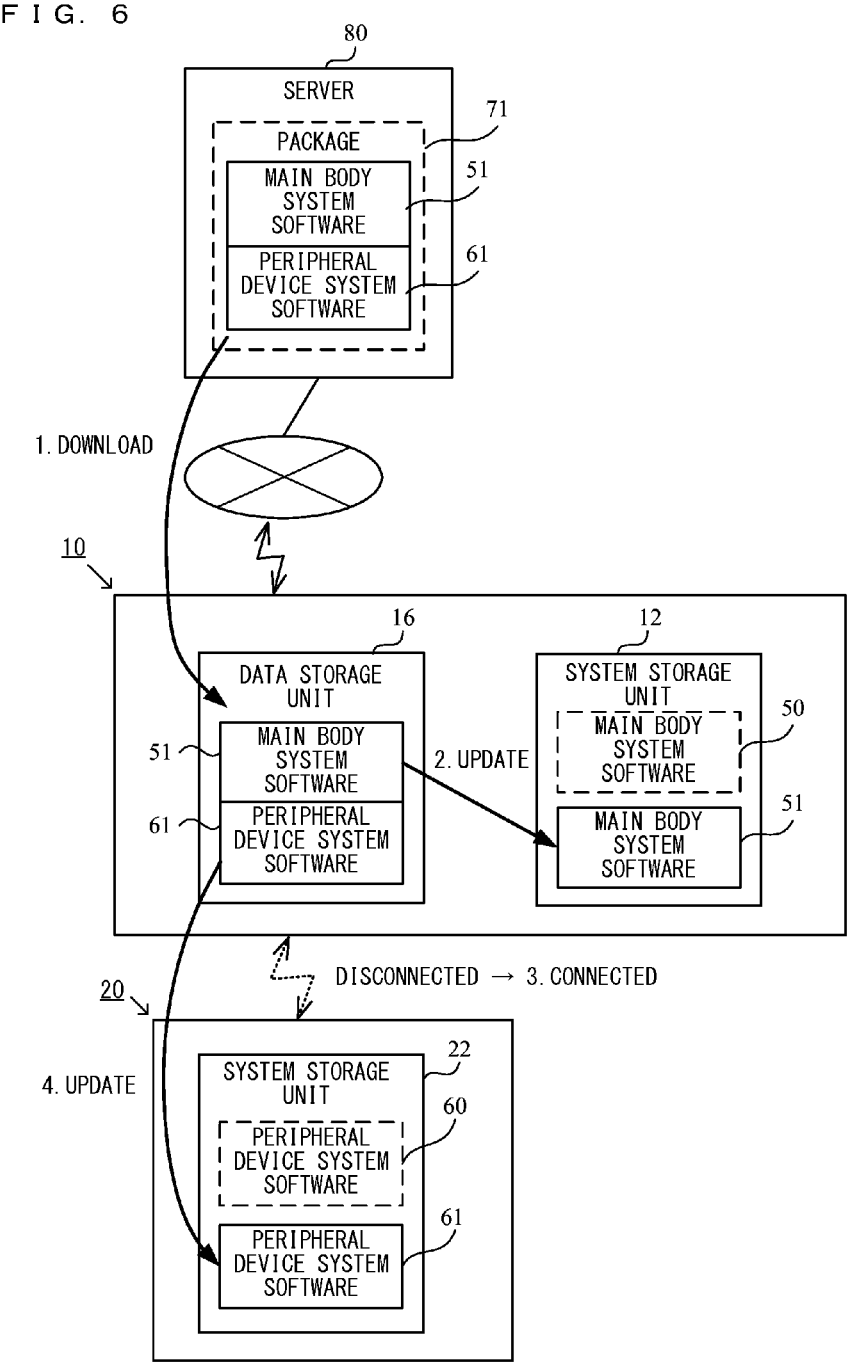
FIG. 6 is a diagram showing a non-limiting example of the state where, when the game apparatus 10 and the peripheral device 20 are not connected to each other, the game apparatus 10 downloads pieces of system software from a server on the Internet, thereby updating the pieces of system software of the game apparatus 10 and the peripheral device 20.

FIG. 6 is a diagram showing the state where, when the game apparatus 10 and the peripheral device 20 are not connected to each other, the game apparatus 10 downloads the latest pieces of system software from a server on the Internet, thereby updating the pieces of system software of the game apparatus 10 and the peripheral device 20.

As shown in FIG. 6, even if the game apparatus 10 and the peripheral device 20 are not connected to each other, the game apparatus 10 accesses the server 80 and downloads the package 71 including the main body system software 51 and the peripheral device system software 61. The main body system software 51 and the peripheral device system software 61 that have been downloaded are stored in the data storage unit 16. Next, the game apparatus 10 updates the main body system software 50 stored in the system storage unit 12, using the downloaded main body system software 51. If the game apparatus 10 and the peripheral device 20 have been connected to each other after that, the game apparatus 10 transmits the peripheral device system software 61 stored in the data storage unit 16 to the peripheral device 20. The peripheral device 20 updates the peripheral device system software 60 stored in the system storage unit 22, using the received peripheral device system software 61.

FIG. 7 is a diagram showing an overview of the flow of an update process shown in FIG. 6. As shown in FIG. 7, the game apparatus 10 accesses the server 80 at predetermined timing and checks whether or not the latest package data is present. If the latest package data is present, the game apparatus 10 downloads the latest package data (the package including the main body system software 51 and the peripheral device system software 61) from the server 80. Next, the game apparatus 10 checks whether or not the peripheral device 20 is connected to the game apparatus 10. If the peripheral device 20 is not connected to the game apparatus 10, the game apparatus 10 cancels the pairing with the peripheral device 20. Then, the game apparatus 10 determines whether or not the version of the main body system software 50 stored in the system storage unit 12 is older than the version of the downloaded main body system software 51. If having determined that the version of the main body system software 50 stored in the system storage unit 12 is older, the game apparatus 10 updates the main body system software 50 using the main body system software 51.

If the game apparatus 10 and the peripheral device 20 have been paired and connected with each other after that, the game apparatus 10 checks the version of the peripheral device 20. If, as a result of the checking, the version of the current peripheral device system software 60 of the peripheral device 20 is older than the version of the downloaded peripheral device system software 61, the game apparatus 10 transmits the downloaded peripheral device system software 61 to the peripheral device 20. Then, the peripheral device 20 updates the peripheral device system software 60 using the received peripheral device system software 61.

Figure 8:
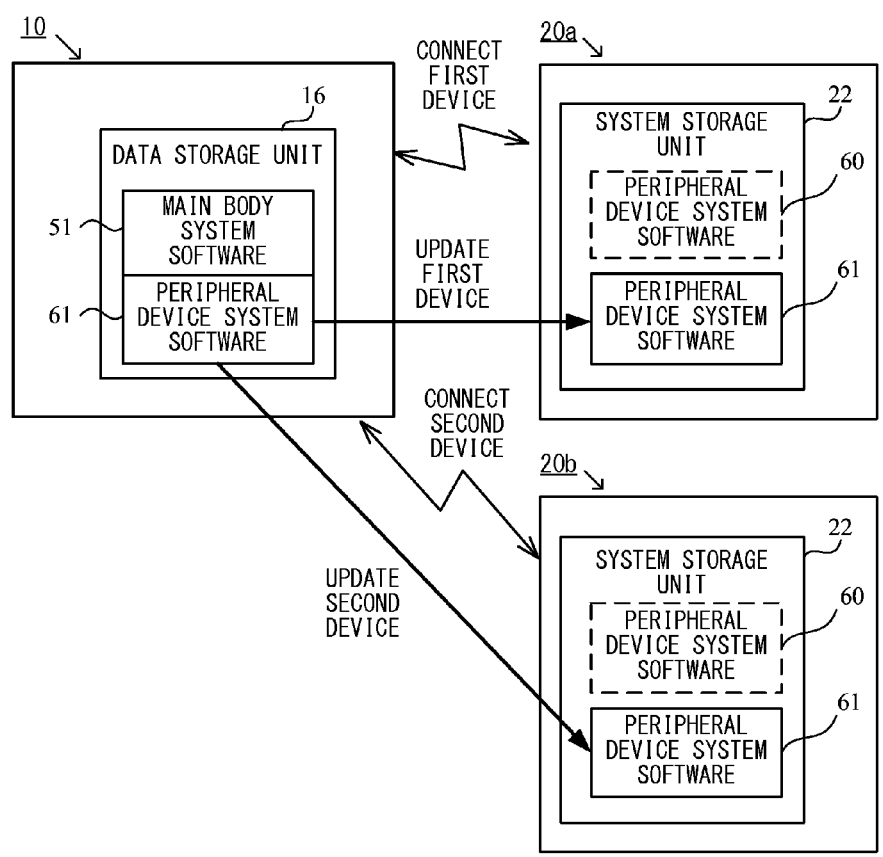
FIG. 8 is a diagram showing a non-limiting example of the state where, after the process of updating the system software of a first peripheral device 20a has been completed, the process of updating the system software of a second peripheral device 20b is performed.

It should be noted that in the exemplary embodiment, even after the process of updating the peripheral device 20 has been completed, the acquired peripheral device system software is saved in the data storage unit 16 of the game apparatus 10. FIG. 8 is a diagram showing the state where, after the process of updating the system software of a first peripheral device 20a has been completed, the process of updating the system software of a second peripheral device 20b is performed.

As shown in FIG. 8, if the second peripheral device 20b has been connected to the game apparatus 10 after the process of updating the first peripheral device 20a has ended, the peripheral device system software 61 saved in the data storage unit 16 is used to update the second peripheral device 20b. Further, third and fourth peripheral devices 20 may be connected to the game apparatus 10 and updated.

As described above, in the exemplary embodiment, even if the game apparatus 10 and the peripheral device 20 are not connected to each other, the game apparatus 10 acquires the main body system software 51 and the peripheral device system software 61 from the server 80 and stores the main body system software 51 and the peripheral device system software 61 in the data storage unit 16 of the game apparatus 10. Then, if the game apparatus 10 and the peripheral device 20 are not connected to each other, only the main body system software of the game apparatus 10 is updated. If the peripheral device 20 has been connected to the game apparatus 10 after that, the peripheral device system software of the peripheral device 20 is updated.

Such a method of updating system software can solve the problem of the connection between two devices. That is, in the case where a piece of system software operates on each of the two devices and the two devices are connected to each other, if the pieces of software are updated one after another with the lapse of time, the number of combinations of all versions of the pieces of system software becomes enormous. If a software provider releases a new version of system software, it is necessary to confirm whether or not the operation between the two devices is performed normally. The enormous number of combinations of all versions requires an enormous amount of time for the confirmation.

The actual processes of updating the game apparatus 10 and the peripheral device 20 are performed by the user using the game apparatus 10. Further, depending on the connection environment, such as whether or not the game apparatus 10 is connected to the Internet, or whether or not the game apparatus 10 and the peripheral device 20 are connected to each other, or depending on the circumstances at that time, it may or may not be possible to perform the processes of updating these devices. Thus, if the update method according to the exemplary embodiment is not used, it can be considered that for example, in some circumstances, if an early version is V0, only the game apparatus 10 is updated to V1, and then, only the game apparatus 10 is further updated to V2. In this case, for example, while the version of the latest peripheral device 20 that has already been released is V2, the version of the actual peripheral device 20 may still be V0.

In the exemplary embodiment, however, if the game apparatus 10 and the peripheral device 20 are connected to each other, the pieces of system software of these two devices are downloaded, and the processes of updating the two devices are simultaneously performed. Further, even if the game apparatus 10 and the peripheral device 20 are not connected to each other, the latest main body system software and the latest peripheral device system software corresponding thereto are acquired and saved in the game apparatus 10. If the latest main body system software has been acquired, the process of updating the game apparatus 10 is performed. If the peripheral device 20 has been connected to the game apparatus 10 after that, the process of updating the peripheral device 20 is forcibly performed. That is, even if the game apparatus 10 is not connected to the Internet, the process of updating the peripheral device 20 is automatically performed using the latest peripheral device system software saved in the data storage unit 16 of the game apparatus 10.

Thus, in the exemplary embodiment, it is possible to make as small as possible the difference in version between the game apparatus 10 and the peripheral device 20 which is caused by a user environment or usage. This makes it possible to reduce the burden on a software provider when releasing system software, and also prevent unexpected trouble.

In addition, in the exemplary embodiment, two pieces of system software are packaged and uploaded to the server 80, and the package is downloaded to the game apparatus 10. Two pieces of system software are thus uploaded as a set to a server. This makes it possible to make the difference in version between the game apparatus 10 and the peripheral device 20 smaller than when the two pieces of system software are separately uploaded to the server 80 and separately downloaded. For example, the case is considered where two corresponding pieces of system software are released such that one has been uploaded to the server 80 first, and the other has been uploaded to the server 80 later. If the game apparatus 10 accesses the server 80 when one has already been uploaded but the other has not yet been uploaded, the difference in version between the game apparatus 10 and the peripheral device 20 may be caused on the user side. In the exemplary embodiment, however, two pieces of system software are packaged and simultaneously released, which makes it unlikely to produce combinations unexpected by the software provider.

It should be noted that in the exemplary embodiment, the game apparatus 10 transmits update data for the peripheral device system software to the peripheral device 20, thereby causing the peripheral device 20 to perform the update process. In another exemplary embodiment, the game apparatus 10 may write the downloaded update data for the peripheral device system software directly to the system storage unit 22 of the peripheral device 20, thereby updating the peripheral device 20. That is, the game apparatus 10 may indirectly or directly update the system software of the peripheral device 20 using the downloaded update data for the peripheral device system software.

In addition, the game apparatus 10 may download the entirety of the latest system software (that is, all data of the system software) as update data for updating the system software, or may download data including only updated part of the system software, as update data.

In addition, in the exemplary embodiment, if the game apparatus 10 and the peripheral device 20 have not been connected to each other when the latest package has been acquired, only the game apparatus 10 is updated. If the peripheral device 20 has been connected to the game apparatus 10 after that, the peripheral device 20 is updated. In another exemplary embodiment, if the game apparatus 10 and the peripheral device 20 have not been connected to each other when the latest package has been acquired, the game apparatus 10 may not be updated. Then, if the peripheral device 20 has been connected to the game apparatus 10 after that, the game apparatus 10 and the peripheral device 20 may be updated.

In addition, in the exemplary embodiment, two pieces of system software are packaged into one package and distributed as a set (uploaded to a server and acquired by the game apparatus 10). Alternatively, two pieces of system software may be distributed in any form so long as the two pieces of system software are distributed as a set.

In addition, in the exemplary embodiment, the game apparatus 10 and the peripheral device 20 are connected wirelessly to each other. Alternatively, the game apparatus 10 and the peripheral device 20 may be detachably connected to each other using wired communication.

(Detailed Flow)

Figure 9:
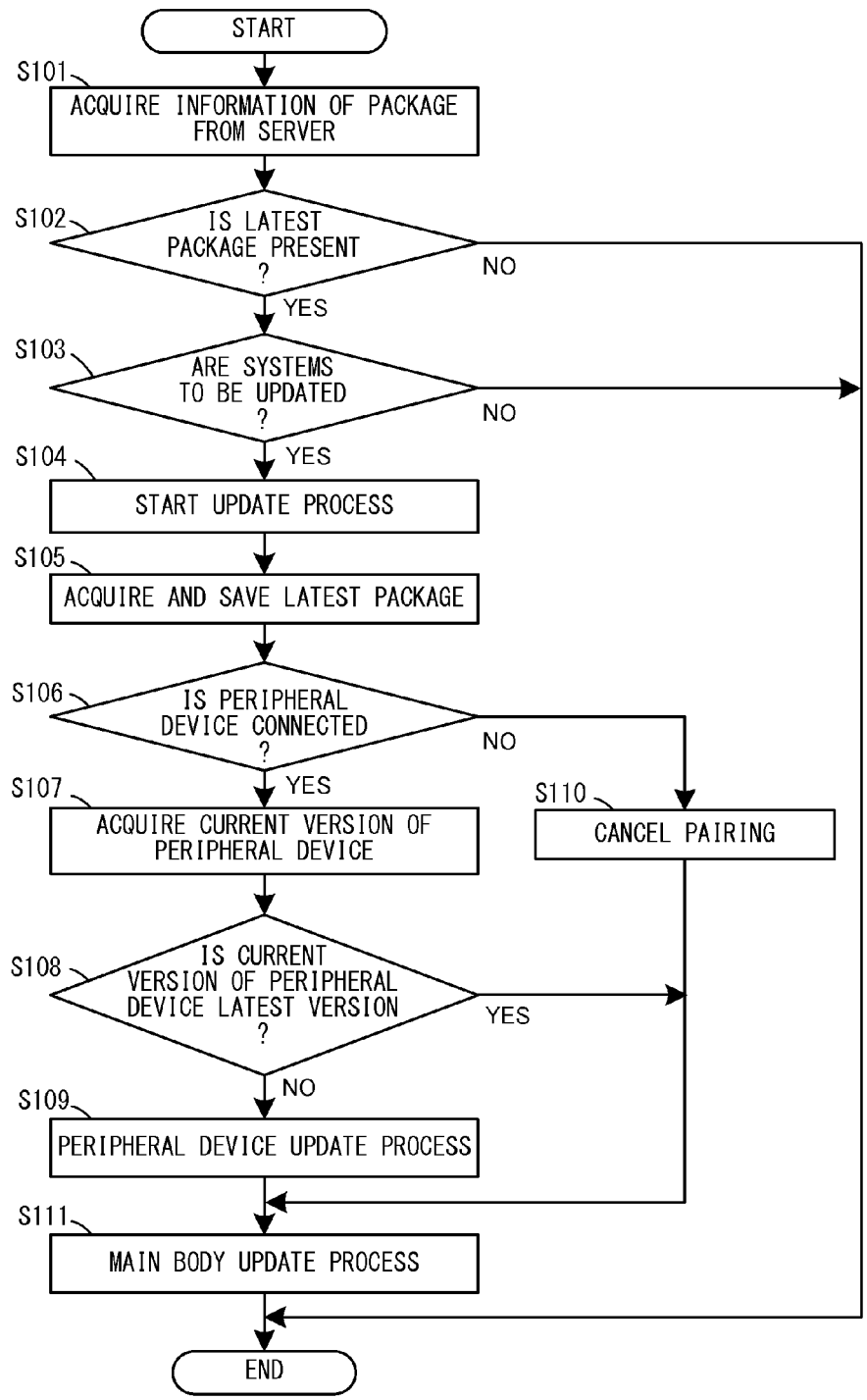
FIG. 9 is a flow chart showing non-limiting examples of the details of the processing performed by the game apparatus 10.

Next, the details of the above process of updating the pieces of system software are described. FIG. 9 is a flow chart showing the details of the processing performed by the game apparatus 10. The game apparatus 10 has stored therein a program for performing the processing in FIG. 9. The CPU 11 of the game apparatus 10 loads the program into the RAM 13 and executes the program, thereby performing the processing shown in FIG. 9.

As shown in FIG. 9, the game apparatus 10 accesses the server 80 and acquires the version information of the package stored in the server 80 (step S101). On the basis of the acquired version information of the package and the version information of the main body system software 50 stored in the system storage unit 12, the game apparatus 10 determines whether or not the latest package is present on the server 80 (step S102). If the latest package is not present (step S102: NO), the game apparatus 10 ends the processing shown in FIG. 9. It should be noted that the game apparatus 10 may store the version information of the current package in the system storage unit 12 and determine whether or not the version information of the current package matches the version information of the package acquired from the server 80, thereby determining whether or not the latest package is present on the server 80.

If the latest package is present on the server 80 (step S102: YES), for example, on the basis of whether or not an instruction has been given by the user, the game apparatus 10 determines whether or not the pieces of system software of the game apparatus 10 and/or the peripheral device 20 are to be updated (step S103). If the pieces of system software are not to be updated (step S103: NO), the game apparatus 10 ends the processing shown in FIG. 9.

If having determined that the pieces of system software are to be updated (step S103: YES), the game apparatus 10 starts the update process (step S104). Then, the game apparatus 10 acquires the latest package (the main body system software 51 and the peripheral device system software 61) from the server 80 and saves the latest package in the data storage unit 16 (step S105). Next, the game apparatus 10 determines whether or not the peripheral device 20 is connected to the game apparatus 10 (step S106). If the peripheral device 20 is not connected to the game apparatus 10 (step S106: NO), the game apparatus 10 cancels the pairing with the peripheral device 20 (step S110). Specifically, the game apparatus 10 erases the identification information stored in the game apparatus 10 for the connection with the peripheral device 20.

If, on the other hand, the peripheral device 20 is connected to the game apparatus 10 (step S106: YES), the game apparatus 10 acquires the current version of the peripheral device 20 (step S107). Specifically, the game apparatus 10 transmits a request to the peripheral device 20 and acquires the version information of the current peripheral device system software 60 from the peripheral device 20.

Next, the game apparatus 10 compares the version of the latest peripheral device system software 61 acquired in step S105, with the version of the current peripheral device system software 60 acquired in step S107, thereby determining whether or not the current version of the peripheral device 20 is the latest version (step S108).

If the current version of the peripheral device 20 is not the latest version (step S108: NO), the game apparatus 10 performs a peripheral device update process (step S109). In the peripheral device update process, the game apparatus 10 transmits the peripheral device system software 61 saved in the data storage unit 16 to the peripheral device 20, thereby causing the peripheral device 20 to perform the process of updating the system software. In accordance with the reception of the peripheral device system software 61, the peripheral device 20 updates the peripheral device system software 60 stored in the system storage unit 22.

If the process of step S109 has been performed, or if the process of step S110 has been performed, or if the current version of the peripheral device 20 is the latest version (step S108: YES), the game apparatus 10 performs a main body update process (step S111). In the main body update process, the game apparatus 10 determines whether or not the version of the main body system software 51 saved in the data storage unit 16 is newer than the version of the main body system software 50 of the system storage unit 12. Then, if the main body system software 51 saved in the data storage unit 16 is newer, the game apparatus 10 updates the main body system software 50 stored in the system storage unit 12, using the main body system software 51. It should be noted that the peripheral device update process may be performed after the main body update process. This is the end of the processing shown in FIG. 9.

Next, with reference to FIG. 10, a description is given of the processing performed by the game apparatus 10 in the case where, if the peripheral device 20 has not been connected to the game apparatus 10 when the game apparatus 10 has acquired the latest system software (NO in the above step S106), the peripheral device 20 is connected to the game apparatus 10 later. FIG. 10 is a flow chart showing the details of the processing performed by the game apparatus 10 when the peripheral device 20 is connected to the game apparatus 10 later.

As shown in FIG. 10, the game apparatus 10 performs a pairing process (step S121). Here, for example, the game apparatus 10 receives a pairing request from the peripheral device 20 and performs predetermined processing. Specifically, the game apparatus 10 and/or the peripheral device 20 each store the identification information of the communication partner device (information specific to the device and stored in advance, information generated in the device, or the like). For example, the game apparatus 10 receives a pairing request including the identification information of the peripheral device 20 from the peripheral device 20, and in accordance with the request, causes the identification information of the game apparatus 10 to be displayed on the television 30. Then, the game apparatus 10 receives information from the peripheral device 20 within a predetermined time. Next, the game apparatus 10 determines whether or not the pairing with the peripheral device 20 has been successful (step S122). For example, if the information received from the peripheral device 20 within the predetermined time is equal to the information displayed on the television 30, the game apparatus 10 determines that the pairing has been successful. If the pairing has been successful (step S122: YES), the game apparatus 10 transmits, to the peripheral device 20, information indicating that the pairing has been successful, and the game apparatus 10 also saves the identification information of the peripheral device 20 in the game apparatus 10, thereby completing the connection with the peripheral device 20 (step S123).

Next, the game apparatus 10 acquires the current version of the system software of the peripheral device 20 (step S124). Then, the game apparatus 10 determines whether or not the current version of the peripheral device 20 is the latest version (step S125). If the current version of the peripheral device 20 is not the latest version (step S125: NO), the game apparatus 10 performs the process of updating the peripheral device 20 (step S126). The processes of steps S124 to S126 are similar to the processes of the above steps S107 to S109.

If the process of step S126 has been performed, or if the determination of step S122 has been NO, or if the determination of step S125 has been YES, the game apparatus 10 ends the processing shown in FIG. 10.

Next, with reference to FIG. 11, a description is given of the processing performed by the peripheral device 20 in the case where, if the peripheral device 20 has not been connected to the game apparatus 10 when the game apparatus 10 has acquired the latest system software (NO in the above step S106), the peripheral device 20 is connected to the game apparatus 10 later. FIG. 11 is a flow chart showing the details of the processing performed by the peripheral device 20 when the peripheral device 20 is connected to the game apparatus 10 later. The CPU 21 of the peripheral device 20 loads a predetermined program into the RAM 23 and executes the predetermined program, thereby performing the processing shown in FIG. 11.

As shown in FIG. 11, the peripheral device 20 performs a pairing process (step S201). Here, if a predetermined operation button has been pressed, the peripheral device 20 transmits a pairing request to the game apparatus 10 and performs predetermined processing. For example, in accordance with the pressing of the predetermined operation button, the peripheral device 20 transmits to the game apparatus 10 a pairing request including the identification information of the peripheral device 20, and thereafter receives an input from the user. Then, the peripheral device 20 transmits the input information to the game apparatus 10. Next, the peripheral device 20 receives, from the game apparatus 10, information regarding whether or not the pairing has been successful, and the peripheral device 20 determines whether or not the pairing with the game apparatus 10 has been successful (step S202). If the pairing has not been successful (step S202: NO), the peripheral device 20 ends the processing shown in FIG. 11. If the pairing has been successful (step S202: YES), the peripheral device 20 completes the connection with the game apparatus 10 (step S203). It should be noted that the peripheral device 20 may or may not save the identification information of the game apparatus 10.

Next, the peripheral device 20 receives from the game apparatus 10 a request to transmit the version information (step S204), and in accordance with the request, transmits the version information of the current peripheral device system software 60 stored in the system storage unit 22 to the game apparatus 10 (step S205).

Next, the peripheral device 20 determines whether or not the latest peripheral device system software 61 has been received from the game apparatus 10 (step S206). If the latest peripheral device system software 61 has not been received (step S206: NO), the peripheral device 20 ends the processing shown in FIG. 11.

If the latest peripheral device system software 61 has been received (step S206: YES), the peripheral device 20 performs the peripheral device update process (step S207). Consequently, the peripheral device 20 updates the peripheral device system software 60 stored in the system storage unit 22, using the latest peripheral device system software 61 received from the game apparatus 10. This is the end of the processing shown in FIG. 11.

As described above, in the exemplary embodiment, the game apparatus 10 acquires the latest versions of the main body system software and the peripheral device system software from a server and stores the latest versions (step S105). If the peripheral device 20 is connected to the game apparatus 10, the two devices are updated when the latest versions have been acquired (step S109, step S111). If the peripheral device 20 is not connected to the game apparatus 10, only the game apparatus main body 10 has been updated (step S111). Then, when the peripheral device 20 has been connected to the game apparatus 10 (step S123, step S203) after that, the peripheral device is updated using the saved peripheral device system software (step S126, step S207).

It should be noted that the flow charts shown in FIGS. 9 to 11 are merely illustrative. Thus, the processing order of the steps may be changed, or a process may be added, changed, or deleted, so long as similar results are obtained. Alternatively, some or all of the processing of the flow charts may be performed by another general-purpose processor or another dedicated circuit other than the CPU 11 or 21. Yet alternatively, some of the processing performed by the game apparatus 10 may be performed by the peripheral device 20, or vice versa.

In addition, the processing performed by the game apparatus 10 may be performed by any information processing apparatus (any information processing system including one or more apparatuses).

Examples of any information processing apparatus (system) include personal computers, servers, smartphones, mobile phones, PDAs, game apparatuses, tablet computers, and the like. A peripheral device can be connected to the information processing apparatus. Then, pieces of system software of the information processing apparatus and the peripheral device may be updated using the update method described above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system capable of being connected to a second device having second system software, the information processing system comprising:
   a storage configured to store first system software for controlling the information processing system; and a computer processor configured to perform at least:
   update data acquisition for, in both a case where the information processing system is capable of communicating with the second device and a case where the information processing system is incapable of communicating with the second device, externally acquiring first update data for updating the first system software, together with second update data for updating the second system software, and saving the first update data and the second update data; wherein the second update data is acquired prior to the first update data being activated, and updating the first system software stored in the storage and the second system software, using the first update data and the second update data, wherein the updating is performed by:

even when the information processing system is incapable of communicating with the second device, the first update data and the second update data are externally acquired, and the first update data and the second update data are stored in a storage device of the information processing system, and if the information processing system becomes capable of communicating with the second device, the second system software of the second device is automatically updated based on the second update data stored in the storage device, and after the second system software of the second device is updated, and if a new second device becomes capable of communicating with the information processing system, second system software of the new second device is automatically updated using the second update data stored in the storage device.

2. The information processing system according to claim 1, computer processor further configured to perform a connection determination for determining whether or not the second device is connected to the information processing system, wherein if the second device is not connected to the information processing system, the updating updates the first system software using the first update data without updating the second system software.

3. The information processing system according to claim 2, wherein if, after the updating has updated the first system software using the first update data when the second device had not been connected to the information processing system, the second device has been connected to the information processing system, the updating updates the second system software using the second update data acquired together with the first update data during the update data acquisition.

4. The information processing system according to claim 3, wherein if the second device has been connected to the information processing system, the updating automatically updates the second system software, not on the basis of an operation of a user.

5. The information processing system according to claim 3, the computer processor further configured to perform a second device determination for, if the second device has been connected to the information processing system, determining, on the basis of the second update data and the second system software stored in the second device, whether or not the second system software is to be updated, wherein if the computer processor has determined that the second system software is to be updated, the updating updates the second system software using the second update data.

6. The information processing system according to claim 2, wherein if the second device is connected to the information processing system, the updating updates the first system software using the first update data, and also updates the second system software using the second update data.

7. The information processing system according to claim 1, wherein the update data acquisition holds the second update data even after the updating updates the second system software.

8. The information processing system according to claim 1, wherein the update data acquisition acquires the first update data and the second update data corresponding to the first update data.

9. The information processing system according to claim 1, wherein the update data acquisition acquires the first update data and the second update data as a set.

10. The information processing system according to claim 1, further comprising a network connector capable of being connected to a network, or a medium data reader capable of reading external data from a portable storage medium, wherein the update data acquisition acquires the first update data and the second update data via the network or the storage medium.

11. The information processing system according to claim 1, further comprising:

a connection information storage configured to store connection information required for communication with the second device; the computer processor further configured to if the connection information is stored in the connection information storage, communicate with the second device; and if the second device is not connected to the information processing system when the updating updates the first system software and the second system software, delete the connection information stored in the connection information storage.

12. An information processing apparatus for being connected to a first device having a first system software and cooperating with the first device, the first device, in both a case where the information processing apparatus is capable of communicating with the first device and a case where the information processing apparatus is incapable of communicating with the first device, externally acquiring first update data for updating the first system software, together with second update data for updating second system software for controlling the information processing apparatus, and saving the first update data and the second update data, wherein the second update data is acquired prior to the first update data being activated, the information processing apparatus comprising:

a storage configured to store the second system software; and a computer processor configured to perform at least:

a connection establishment for transmitting or receiving information to or from the first device, and establishing a connection between the information processing apparatus and the first device;

after the connection establishment has established the connection between the information processing apparatus and the first device, notifying the first device of version information of the second system software stored in the storage; and updating, for receiving the second update data transmitted from the first device in accordance with the made notification, and updating the second system software stored in the storage, using the received second update data, wherein the updating is performed by:

even when the information processing apparatus is incapable of communicating with the first device, the first update data and the second update data are externally acquired, and the first update data and the second update data are stored in a storage device of the first device, and if the information processing apparatus becomes capable of communicating with the first device, the second system software of the information processing device is automatically updated based on the second update data stored in the storage device, and after the second system software of the information processing device is updated, and if a new information processing device becomes capable of communicating with the first device, second system software of the new information processing device is automatically updated using the second update data stored in the storage device.

13. An information processing apparatus capable of being connected to a second device having second system software, the information processing apparatus comprising:

a storage configured to store first system software for controlling the information processing apparatus; and a computer processor configured to perform at least:

update data acquisition for, in both a case where the information processing apparatus is capable of communicating with the second device and a case where the information processing apparatus is incapable of communicating with the second device, externally acquiring first update data for updating the first system software, together with second update data for updating the second system software, and saving the first update data and the second update data; wherein the second update data is acquired prior to the first update data being activated, and updating the first system software stored in the storage and the second system software, using the first update data and the second update data, wherein the updating is performed by:

even when the information processing apparatus is incapable of communicating with the second device, the first update data and the second update data are externally acquired, and the first update data and the second update data are stored in a storage device of the information processing system, and if the information processing apparatus becomes capable of communicating with the second device, the second system software of the second device is automatically updated based on the second update data stored in the storage device, and after the second system software of the second device is updated, and if a new second device becomes capable of communicating with the information processing system, second system software of the new second device is automatically updated using the second update data stored in the storage device.

14. A non-transitory computer-readable storage medium having stored therein an information processing program to be executed by a computer of an information processing system which is capable of being connected to a second device having second system software and in which first system software is stored, the information processing program causing the computer to execute:

in both a case where the information processing system is capable of communicating with the second device and a case where the information processing system is incapable of communicating with the second device, externally acquiring first update data for updating the first system software, together with second update data for updating the second system software, and saving the first update data and the second update data; wherein the second update data is acquired prior to the first update data being activated, and updating the first system software stored in the information processing system and the second system software, using the first update data and the second update data, wherein the updating is performed by:

even when the information processing system is incapable of communicating with the second device, the first update data and the second update data are externally acquired, and the first update data and the second update data are stored in a storage device of the information processing system, and if the information processing system becomes capable of communicating with the second device, the second system software of the second device is automatically updated based on the second update data stored in the storage device, and after the second system software of the second device is updated, and if a new second device becomes capable of communicating with the information processing system, second system software of the new second device is automatically updated using the second update data stored in the storage device.

15. An information processing method to be executed by an information processing system which is capable of being connected to a second device having second system software and in which first system software is stored, the information processing method comprising:

in both a case where the information processing system is capable of communicating with the second device and a case where the information processing system is incapable of communicating with the second device, externally acquiring first update data for updating the first system software, together with second update data for updating the second system software, and saving the first update data and the second update data; wherein the second update data is acquired prior to the first update data being activated, and updating the first system software stored in the information processing system and the second system software, using the first update data and the second update data, wherein the updating is performed by:

even when the information processing system is incapable of communicating with the second device, the first update data and the second update data are externally acquired, and the first update data and the second update data are stored in a storage device of the information processing system, and if the information processing system becomes capable of communicating with the second device, the second system software of the second device is automatically updated based on the second update data stored in the storage device, and after the second system software of the second device is updated, and if a new second device becomes capable of communicating with the information processing system, second system software of the new second device is automatically updated using the second update data stored in the storage device.

* * * * *